Patented Mar. 16, 1948

2,437,857

UNITED STATES PATENT OFFICE 2,437,857

TERPENE PRODUCT

Donald A. Lister, Brunswick, Ga., assignor to Hercules Powder Company, Wilmington, Del., a corporation of Delaware No Drawing. Application May 11, 1945,
Serial No. 593,311

1 Claim. (Cl. 260—631.5)

This invention relates to the production of freely water-soluble terpene products by the simultaneous oxidation and hydration of terpinolene and more particularly to an unsaturated trihydric terpene alcohol produced thereby.

Terpinolene or terpene hydrocarbon fractions which are chiefly composed of terpinolene may be reacted with a gas containing free oxygen, such as oxygen or air, and with water, to produce a mixture of a terpene material which is freely soluble in water and a terpene material which is water-insoluble. The freely water-soluble material has been found to be a mixture of unsaturated compounds, including menthenetriols with hydroxyls in glycolic arrangement, which are crystalline when isolated. In addition to these highly hydroxylated crystalline compounds, the water-soluble material comprises syrupy hydroxylated terpene derivatives which are not readily crystallized. The reaction also forms, as a by-product, a useful water-insoluble oil which is partly polymeric and less oxygenated than the water-soluble material.

Now in accordance with this invention the water-soluble trihydric terpene alcohol in which two hydroxyl radicals are attached to adjacent carbon atoms and which contains one double bond per molecule and is characterized by the capacity of forming white, triclinic crystals having a melting point of 121°-122° C. and a refractive index of about 1.54 when crystallized from aqueous acetone may be prepared by reacting terpinolene, or terpene hydrocarbon fractions rich in terpinolene, with a gas containing free oxygen and with water to form a mixture of a terpene material which is freely soluble in water and a material which is water-insoluble and isolating the said trihydric terpene alcohol from the water-soluble terpene material by fractional crystallization.

In order to obtain the above water-soluble menthenetriol, the terpene or terpene hydrocarbon fraction boiling within the range of about 180° C. to about 195° C. and having a specific gravity within the range of about 0.855 to about 0.873, which is believed to be chiefly terpinolene, is intimately contacted with water and with a gas containing free oxygen, such as air or free oxygen, at temperatures of from about 0° C. to about 90° C. for a prolonged period of time until a freely water-soluble product is formed. The reaction mixture is then separated into a water-soluble fraction and a water-insoluble fraction. The water-soluble fraction may be resolved into its components in a number of ways. The water may be removed from the water-soluble fraction leaving a water-soluble syrup from which the various trihydric terpene alcohols may be fractionally crystallized or the syrup may be allowed to crystallize to form a mixture of the crystalline trihydric alcohols which may then be separated by fractional crystallization. Three crystalline menthenetriols having melting points of 135° C.-136° C., 124° C.-125° C. and 121° C.-122° C. may be obtained from this water-soluble fraction and, in addition, a water-soluble non-crystallizing syrup is obtained.

The following examples illustrate the method in accordance with this invention whereby the water-soluble material from which the trihydric terpene alcohol having a melting point of 121° C.-122° C. is obtained. All parts given in the examples are parts by weight unless otherwise indicated.

Example I

A mixture of 300 parts of terpinolene (95% pure, refractive index 1.4888), 300 parts of water and 1.5 parts of Darco activated carbon were agitated for 8 days in a bath held at 55° C. while air saturated with moisture was bubbled through the mixture. The mixture was then separated into two layers. The oily layer in this case consisted of 40 parts by weight of viscous liquid heavier than the aqueous layer. The aqueous layer was washed with 80 parts of benzene and then freed of water by vacuum distillation at 60° C. to form 330 parts of water-soluble syrup.

Example II

Two thousand parts of a terpinolene cut having a boiling point range of 180° C.-195° C. and a specific gravity within the range of 0.55 to 0.873 and 1000 parts of water were agitated at a temperature of 26° C.-35° C. for a period of 297 hours. During this time, a small stream of air was passed through the reaction mixture. The final product was allowed to stratify and on separation of the layers 1050 parts of oil and 2750 parts of water layer were obtained. The water layer was carefully evaporated on a steam bath (temperature of 50° C.-60° C.) at reduced pressure (20 mm. Hg), whereby 928 parts of a pale-colored, water-soluble, viscous liquid product was obtained.

Example III

Three thousand parts of a terpene fraction composed approximately of two-thirds terpinolene and one-third terpinene, dipentene, water-insoluble terpene alcohols, etc., were agitated for a period of six days at room temperature with 600 parts of water in the presence of air. During this period the relative volume of the oil phase progressively decreased, with a corresponding increase in the volume of the water phase. At the end of the reaction period only a small amount of oil phase remained. This phase consisted largely of terpinene, dipentene, water-insoluble terpene alcohols and some water-soluble terpene alcohol; while the aqueous phase was comprised of water, water-soluble terpene alcohols, and some water-insoluble terpene alcohols produced by oxidation and hydration, held in solution by the high proportion of water-soluble terpene alcohol present. The two phases were then separated by the usual means, and the water phase diluted with an equal volume of water. This dilution threw the water-insoluble components out of the solution, leaving the water-soluble alcohols in solution. The water was then evaporated from this aqueous solution under vacuum. The last trace of water was then removed from the water-soluble syrup by blowing with carbon dioxide.

The water-soluble syrup prepared as in the foregoing examples may then be allowed to crystallize spontaneously whereby a mixture of the three crystalline trihydric terpene alcohols is obtained. However, the mixed crystalline product separates very slowly from the dehydrated syrup. Solvent crystallization is much quicker and more complete. For example, crystallization of the mixed crystalline product from acetone usually gives a yield of about 45% of the syrup. Other solvents which may be used for this solvent crystallization include nitromethane, ethyl acetate, isopropyl acetate, and methyl ethyl ketone. The following example illustrates the recovery of the mixed crystalline product from the water-soluble syrup with the aid of a solvent.

Example IV

One hundred parts of the syrup were dissolved in 400 parts of acetone at a temperature of 56° C. The solution was then cooled to 15° C. and permitted to stand 24 hours until crystallization became complete. The white crystals which formed were separated from the solution, washed with benzene, and dried. A quantity of 45 parts by weight was recovered. The crystalline product had a melting range of 102° C.–128° C. with most of the material melting at about 120° C.; it was substantially identical with the product formed by spontaneous crystallization from the syrup.

The mixed crystalline product obtained by spontaneous or solvent crystallization from the water-soluble syrup may then be fractionally crystallized to obtain the three crystalline trihydric alcohols. If desired, the water-soluble syrup may be fractionally crystallized directly without isolating the mixed crystalline product, to obtain the three crystalline alcohols. The following example illustrates the method of resolving the water-soluble syrup into its components.

Example V

The water-soluble syrup obtained by the method given in the foregoing examples (1136 parts) was refluxed with 2000 parts of ethyl acetate until solution was complete. On cooling to 0° C., 164 parts or 14.5% of the crystals of the trihydric terpene alcohol melting at 135° C.–136° C. were obtained. The mother liquor was recovered by distilling off the ethyl acetate at reduced pressure, and 1500 parts of acetone were added and the mass was refluxed until solution was complete. On cooling to 0° C., 155.5 parts or 13.7% of a crystalline material having a melting point of 105° C.–110° C. were obtained. This crystalline material was then fractionally crystallized using ethyl acetate as a solvent. In this way a fraction representing about 10% of the total water-soluble product was obtained which had a sharp melting point of 124° C.–125° C. The remaining fractions of crystalline material were combined and fractional crystallization was continued using anhydrous 2B alcohol as the solvent. The anhydrous alcohol was evaporated from a fraction having a melting point of 108° C.–109° C. and recrystallization of this material from aqueous acetone yielded "bayonette shaped" crystals which melted sharply at 121° C. Continued fractional crystallization of the material gave the following total yields of crystalline products based on the total amount of water-soluble product: 24% of the trihydric terpene alcohol having a melting point of 135° C.–136° C.; 10% of the trihydric terpene alcohol having a melting point of 124° C.–125° C.; and 10% of the trihydric terpene alcohol having a melting point of 121° C.–122° C.

The terpene hydrocarbon or terpene fraction reacted with water and oxygen in accordance with this invention will boil within the range of about 180° C. to about 195° C. at 760 mm. pressure, will have a specific gravity of about 0.855 to about 0.873

$$\left(\frac{15.6° \text{ C.}}{15.6° \text{ C.}}\right)$$

and will have a refractive index between about 1.4750 and about 1.4900. Preferably it will boil within the range of about 187° C. to about 191° C., will have a specific gravity of about 0.860 to about 0.865

$$\left(\frac{15.6° \text{ C.}}{15.6° \text{ C.}}\right)$$

and will have a refractive index of about 1.4883 to about 1.4890. It is believed to be terpinolene, although this identification is not positive, due to conflicting physical constants given for terpinolene in the literature. Hereinafter, when the term "terpinolene" is used, it will be understood that a terpene hydrocarbon cut having a boiling range of about 180° C. to about 195° C. and a specific gravity within the range of about 0.855 to about 0.873

$$\left(\frac{15.6° \text{ C.}}{15.6° \text{ C.}}\right)$$

or the purer preferred material is meant.

Terpinolene or mixtures rich in terpinolene may be used in the method in accordance with this invention. Various commercially available terpene "cuts" may be used, although it will be understood that the closer the boiling range of the "cut" is to 187° C. to 191° C., which represents terpinolene of fairly high purity, terpinolene of absolute purity being thought to boil at about 188° C., the more efficient the reaction will be. A terpene fraction boiling in the range of about 180° C. to about 195° C. and having a specific gravity within the range of 0.863 to 0.873, secured in the refining of crude wood turpentine, is satisfactory for the purpose. Likewise, a terpene mixture secured as a by-product of the manufacture of camphor, boiling within the range of about 180° C. to about 190° C. and sold under the trade name of "Terpene B" may be used. Likewise, substantially pure alphaterpineol may be dehydrated with sodium acid sulfate and the resultant product fractionated to separate a cut with a boiling range of 187° C. to 191° C., which is particularly suitable for reaction in accordance with this invention.

Another example of a terpene fraction which is highly suitable is the "terpinolene cut" separated from crude wood turpentine, having substantially the following characteristics:

Distillation range of _____ 180.0°–190.0° C.
Specific gravity _____ 0.8702
Refractive index _____ 1.4857
Specific rotation_____ +0.6

The relative proportions of terpinolene, or of a terpene fraction containing terpinolene, and of water used in the method in accordance with this invention will be determined by convenience of mixing to secure intimate contact between the two immiscible phases, provided, however, that water is present in excess of that required for reaction with the terpinolene present. It is preferable to have water present in considerable excess of the stoichiometric requirement of the reaction, which is one mole of water per mole of terpinolene.

The reaction may be carried out at any temperature in the range from about 0° C. to about 90° C.; ordinarily room temperature is satisfactory although best yields are obtained at mildly elevated temperatures as between 30° C. and 60° C. Reaction temperatures up to 200° C. may be used but mostly water-insoluble products are formed at the higher temperatures.

It is desirable to keep the water phase and the water-immiscible terpene hydrocarbon phase of the reaction mixture in intimate contact with each other and with an oxygen-containing gas by vigorous agitation and/or emulsification of the reaction mixture. The reaction mixture may be agitated in contact with an oxygen-containing gas or the gas may be bubbled through the mixture. To obtain substantially complete reaction between the terpene hydrocarbon and water, it is necessary to keep the two immiscible phases intimately admixed in the presence of an oxygen-containing gas for a period of from about 24 hours to about 3 weeks or more.

The prolonged reaction time may be shortened materially by conducting the reaction under a pressure of oxygen in excess of that exerted by atmospheric oxygen. Any convenient pressure may be used, for example, from atmospheric to 1000 atmospheres or more, 10–100 atmospheres being usual. Using 10–20 atmospheres oxygen pressure permits reaction in a period as short as about six hours. Air under pressure is entirely suitable.

The reaction time may be materially reduced if catalysts of an oxygen-carrying nature are added to the reaction mixture. The suitable catalysts fall into several groups. The preferred group comprises active solids such as activated carbon, activated alumina, flaked aluminum metal, activated silica, activated clays and the like. Other important groups of oxygen-carriers which may be used as catalysts are the hydrohalides of basic nitrogen compounds, i. e., hydrohalides of amines and ammonia; compounds of elements which readily change in valence such as compounds of lead, cobalt, manganese, chromium, sulfur, etc.; and organic peroxides such as benzoyl peroxide and peroxides formed by blowing air through monocyclic terpenes.

Upon formation of appreciable water-soluble material, or upon completion of the reaction, the reaction mixture is permitted to separate into an oily layer and an aqueous layer. The oily water-insoluble oxygenated by-product may be separated from the oily layer, if desired, by removal of unreacted terpenes by distillation, preferably at reduced pressure. The water-soluble products may be recovered from the water layer, if separation is desired, by evaporation of the water under vacuum. Since excessive heat decomposes the water-soluble products by a dehydration reaction, evaporation of the water layer is desirably carried out at a temperature not in excess of 60° C. and at an absolute pressure of about 25 mm. of mercury. The water-soluble products may be further separated by crystallization from the resulting syrup, as illustrated in the foregoing examples.

Combustion data and Zerewitinoff hydroxyl determinations (about 28% hydroxyl in each case) show the existence of three hydroxyl groups per molecule in each of the crystalline products. Periodic acid titration of these crystalline products shows that they contain two hydroxyl radicals attached to adjacent carbon atoms, i. e., an $\alpha,\beta$-glycol arrangement. This test is described by Fleury and Fatome, J. Pharm. Chim. 21, 247–50 (1935).

The three crystalline products are all characterized by having one double bond per molecule as shown by the determination of the bromine number and the hydrogenation of each of the products. The mixed crystalline product has a bromine number of 80–100. The product melting at 135–136° C. has a bromine number of above 85, usually 90–102. The product melting at 124° C.–125° C. has a bromine number of 50–60. The 135° C.–136° C. melting product has a hydrogen absorption of about 1.04% by weight when hydrogenated with a nickel catalyst at 160° C. and a hydrogen pressure of 3000 pounds per square inch, showing the existence of one double bond in the molecule.

The crystalline unsaturated trihydroxy terpene alcohols lose hydroxyls by dehydration when heated, especially with dehydration catalysts such as sodium acid sulfate, sulfuric acid, phosphorous pentoxide and the like. The hydroxyls lost are on tertiary carbon atoms. The products are thus characterized by a tertiary hydroxyl content.

The white crystalline unsaturated trihydroxy terpene alcohol melting at 121° C.–122° C. has the following crystal constants, melting point and constants being determined upon crystals deposited from solution in aqueous acetone:

Type—triclinic
Appearance—transparent, colorless, tabular, elongated
Optic angle $2V = 77° \pm 3°$
Dispersion==$r > v$
Refractive index—$\alpha = 1.54 \pm 0.01$ The three crystalline trihydric terpene alcohols are all believed to be trihydroxy menthenes in view of the above data. They are characterized by having three hydroxyl groups, two of which are attached to adjacent carbon atoms, and all contain one double bond per molecule. All of the hydroxyls in these products are either secondary or tertiary. In the case of the trihydric terpene alcohol having a melting point of 121° C.–122° C., oxidation with periodic acid indicates that the hydroxyls are in the 1, 2, and 8 positions. Ozonolysis of this alcohol did not produce acetone, showing that there is no double bond in the 4, 8 position; the double bond is believed to be in the 3, 4 position. The crystalline trihydric terpene alcohol having a melting point of 121° C.–122° C. is therefore believed to be p-menth-3-ene-1,2,8-triol. (The numbering of the carbons is by the usual system for paramenthenes in which the cyclic carbons are 1 to 6, starting at the methyl group; the methyl substituent is carbon 7; the tertiary carbon of the isopropyl group is 8; and the two primary carbons of the isopropyl group are 9 and 10.)

It is believed that the reaction of terpinolene with oxygen and water proceeds according to the following mechanism. One molecule of oxygen is added to a methylene group on the terpinolene ring, whereby a hydroperoxide is formed. The hydroperoxide then rearranges to a hydroxy-epoxide (intermolecular oxidation of one double bond) which reacts with water to form a trihydric alcohol.

The crystalline products, both narrow melting and mixed forms, may be stabilized by hydrogenation to form saturated liquid trihydric alcohols which may be esterified with lower fatty acids to form plasticizers or used per se as softeners for water-sensitive materials. The crystalline products may be dehydrated to form terpene alcohols with strong solvent power for oils and resins. They may be dehydrated and dehydrogenated to form phenols useful as antiseptics. They are useful per se in water solution as thickeners, for example, in printing pastes; mixtures with pine oil are useful as detergent aids and flotation agents.

This application is a continuation-in-part of my application, Serial Number 484,481, filed April 24, 1943, now U. S. Patent 2,413,719, issued January 7, 1947, which is in turn a continuation-in-part of my now forfeited application, Serial Number 328,933, filed April 10, 1940, and of my now abandoned application, Serial Number 394,859, filed May 23, 1941.

What I claim and desire to protect by Letters Patent is:

A water-soluble unsaturated trihydric terpene alcohol prepared by the oxidation of terpinolene, the hydroxyl radicals of which alcohol are secondary and tertiary hydroxyls, two of the hydroxyl radicals being attached to adjacent carbon atoms, said alcohol also having one double bond per molecule and being characterized by the capacity of forming white, triclinic crystals having a melting point of 121°–122° C. and a refractive index of about 1.54 when crystallized from aqueous acetone.

DONALD A. LISTER.

REFERENCES CITED

The following references are of record in the file of this patent:
Beilstein, "Handbuch der Organischen Chemie," vol. 6, pages 1070. (Copy in Division 6.)
Ward, "Jour. Am. Chem. Soc.," vol. 60, pages 325–7 (1938). (Copy in Scientific Library.)
Karrer, "Organic Chemistry," page 644. (Copy in Division 6.)